(12) United States Patent
Zeller et al.

(10) Patent No.: US 6,699,518 B2
(45) Date of Patent: Mar. 2, 2004

(54) METHOD OF PREPARING COFFEE AROMATIZING COMPOSITIONS

(75) Inventors: Bary L. Zeller, Glenview, IL (US); Stefano Ceriali, Banbury (GB); Anthony Wragg, Banbury (GB); Anilkumar G. Gaonkar, Buffalo Grove, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 297 days.

(21) Appl. No.: 09/767,403

(22) Filed: Jan. 23, 2001

(65) Prior Publication Data

US 2002/0142082 A1 Oct. 3, 2002

(51) Int. Cl.$^7$ ............................... A23F 5/00; A23F 5/30
(52) U.S. Cl. ..................... 426/430; 426/651; 426/594; 426/386
(58) Field of Search .................... 426/430, 651, 426/386, 594

(56) References Cited

U.S. PATENT DOCUMENTS

| | | | |
|---|---|---|---|
| 3,769,032 A | 10/1973 | Lubsen et al. | |
| 4,008,340 A | 2/1977 | Kung et al. | |
| 4,118,521 A | 10/1978 | Cazenave | |
| 4,119,736 A | 10/1978 | Howland et al. | |
| 4,279,937 A * | 7/1981 | Strobel et al. | |
| 5,229,153 A | 7/1993 | Blanc | 426/386 |
| 5,372,831 A | 12/1994 | Koch et al. | 426/388 |
| 5,399,368 A | 3/1995 | Garwood et al. | 426/307 |
| 5,750,178 A | 5/1998 | Cheng et al. | 426/594 |
| 6,090,427 A | 7/2000 | Mazurek et al. | 426/534 |
| 6,455,093 B1 * | 9/2002 | Furrer et al. | |
| 6,490,883 B2 * | 12/2002 | Trembley et al. | |

* cited by examiner

*Primary Examiner*—Anthony J. Weier
(74) *Attorney, Agent, or Firm*—Larson & Taylor, PLC

(57) ABSTRACT

A method of preparing coffee aromatizing compositions. A coffee aroma such as a coffee aroma frost is contacted with a volatile organic carrier liquid at a processing temperature at which the carrier is in the liquid state and at which any moisture present is in the form of ice, to effect fixation of the aroma into the carrier liquid. The carrier liquid has a freezing point below the processing temperature, a boiling point above the processing temperature, a vapor pressure of at least 0.01 mm Hg at 25° C. and atmospheric pressure, and a water solubility of not more than 10% by weight.

22 Claims, No Drawings

METHOD OF PREPARING COFFEE AROMATIZING COMPOSITIONS

FIELD OF THE INVENTION

The invention relates to methods of preparing coffee aromatizing compositions. In particular, the invention relates to methods of preparing such compositions which are useful to provide coffee beverage preparation aroma.

BACKGROUND OF THE INVENTION

The manufacture of "instant" (or soluble) coffee powder, often involves processing conditions such as elevated temperature, which cause loss of desirable coffee aroma. By the time the powder is prepared, most of the chemicals that create the distinctive pleasurable coffee aroma have evaporated. Unless additional steps are taken during manufacture, there is very little aroma associated with hot coffee beverages prepared from instant coffee powder relative to the aroma of hot coffee beverages prepared from roast and ground coffee. This, in large part, has contributed to consumers viewing instant coffee as an inferior product. Many attempts have been made to enhance the aroma of instant coffee, including the use of particular types of coffee beans, the use of particular coffee roasting conditions, and the addition of coffee aroma.

Coffee aromas and flavors are usually complex, comprising many organoleptically active compounds, which combine in effect to create the characterizing aroma of the product. Since the aromas and flavors are extremely powerful and typically unstable in their undiluted state they are combined with a carrier to render them stable and easier to handle. The carriers are neutral or complementary in organoleptic impact and do not contribute to the characterizing aroma of the product.

Aroma carriers can be liquids or water-soluble solids. In cases where a liquid carrier is used, it is often encapsulated in a solid, water-soluble matrix to further preserve the characterizing aromas from loss or damage. The carrier, often referred to as a solvent in liquid systems, functions as an aroma base and is used to adjust the level of otherwise powerful aroma and taste substances to levels similar to those that exist in nature. Desirable characteristics of carriers for liquid systems include blandness and miscibility with other liquid aromas. The traditional liquid carrier used for coffee aromas, and the liquid carrier perhaps exclusively used for coffee aroma frosts, is coffee oil that has been expelled from roasted coffee or extracted from spent coffee grounds used in the manufacture of instant coffee.

The aroma constituent of an aromatizing composition characterizes its aroma, i.e., the innate quality that gives the aroma its special attributes among and over other aromas. The aroma constituent may, and often does, include a plurality of aroma ingredients which together result in the characterizing aroma.

A particular problem that has been noted in connection with instant coffee is the relative lack of coffee aroma that is generated at the time that a hot instant coffee beverage is prepared compared to the coffee aroma that is generated when brewing roasted and ground coffee. This problem of poor aroma burst or "above-cup aroma" at the time of preparation of an instant coffee beverage is noted in U.S. Pat. No. 5,399,368 assigned to Nestec S.A. and in U.S. Pat. No. 5,750,178 also assigned to Nestec S.A. Each of these patents describes several prior art attempts to provide an initial burst of above-cup coffee aroma, such as by coating soluble coffee powder with an aqueous emulsion of an aromatic coffee substance, or by employing particulate aromatized coffee glass. It is reported in each of these U.S. patents that these and other previously known procedures were not successful in achieving a good above-cup aroma. The '368 and '178 patents propose methods for making capsule particles containing an aromatized coffee oil core.

The amount of above-cup aroma which can be achieved by methods incorporating aromatized coffee oil-containing particles, such as those described in the '368 and '178 patents, into an instant coffee product depends, in large part, on the amount of such particles employed. The use of coffee oils in instant coffee does not normally pose a problem at the low levels needed to provide only a package aroma. However, a relatively large amount of particles must be employed to produce good preparation aroma. This approach may lead to a product having an overwhelmingly strong taste or aroma during consumption. Moreover, the more capsules that are employed, the more capsule material, particularly coffee oil, that is introduced. The added coffee oil accumulates as an oil film on the surface of the coffee beverage. Such oil films are very apparent and are widely known to impair consumer acceptance of instant coffee.

Further, the use of oils during the aroma entrapment stage involves processing at temperatures above the freezing point of oil. At these temperatures, water is present as a liquid and can be detrimental. Methods for decanting the water therein have been patented (Canadian Patent No. 2,091,276). Nevertheless, considerable amounts of aroma are unavoidably decanted with the water phase, and residues of water are left in the oil which hastens degradation of the coffee aroma.

U.S. Pat. No. 5,229,153 discloses a process for the fractionation of coffee aroma in which the residual water phase left after aromatization of an oil by contact with frost is used as a main aroma source to aromatize a second fraction of oil. Because of the hydrophilic nature of this coffee aroma fraction, such a process is relatively inefficient and the character of the coffee aroma entrapped in the oil is significantly different from the original source.

The fixation conditions discussed above lead to changes in the chemical or physical properties of the coffee aroma because of exposure to heat and moisture. In addition, the efficiency of recovery of the most volatile compounds is low, and partitioning of aroma between the water phase and the hydrophobic oil phase can cause imbalance.

It is an object of the invention to provide methods for preparing coffee aromatizing compositions which minimize the problems associated with previously known methods such as flavor imbalance, heat or moisture-induced changes in chemical or physical properties, and low efficiency. It is a further object of the invention to provide such methods which can achieve these goals economically, without the need for complex or expensive apparatus. These and other objects of the invention will be apparent from the detailed description of the invention to follow.

SUMMARY OF THE INVENTION

The invention provides a method for preparing a coffee aromatizing composition which comprises contacting a coffee aroma with a volatile organic carrier liquid at a processing temperature at which said carrier is in the liquid state and at which any moisture present is in the form of ice, and recovering an aromatized carrier liquid, said carrier liquid having a freezing point below said processing temperature and a boiling point above said processing temperature, a vapor pressure of at least 0.01 mm Hg at 25° C. and atmospheric pressure, and having a water solubility of not more than 10% by weight.

DETAILED DESCRIPTION OF PREFERRED EMBODIMENTS

In accordance with the present invention, a coffee aromatizing composition is prepared by contacting a coffee aroma, such as a coffee aroma frost, with a volatile organic carrier liquid at a processing temperature such that any moisture present in the aroma is in the form of ice. Physical properties of the volatile organic carrier liquid are important. The carrier liquid must be liquid at the processing temperature at which any moisture present is in the form of ice. Accordingly, the carrier liquid has a freezing point below the prevailing processing temperature. The carrier liquid freezing point is necessarily less than 0° C., preferably less than −5° C., and more preferably less than −10° C., A common source of coffee aroma is coffee aroma frost obtained from commercial preparation of roasted and ground coffee and of instant coffee. Such coffee aroma frosts include coffee aroma, $CO_2$, and water in the form of ice. When a carrier liquid is aromatized with a $CO_2$-containing coffee aroma frost according to the present invention, the processing temperature is such as to cause sublimation of the $CO_2$. A processing temperature of 0 to −150° C. is suitable for such sublimation, a temperature in the range of −5 to −120° C. is preferred, from −10 to −100° C. is more preferred, and from −20 to −80° C. is most preferred. At these temperatures, $CO_2$ has a significant vapor pressure and can sublime, while even the most volatile of the coffee aroma compounds have a low vapor pressure and will be mainly retained in the liquid carrier. As mentioned above, the carrier liquid will have a freezing point sufficiently below the processing temperature such that it will remain liquid at the prevailing processing temperature. For aromatizing with such frosts, a carrier liquid freezing point of less than 0° C. is necessary, a freezing point of less than −80° C. is suitable, and a freezing point of less than −10° C. is preferable.

The vapor pressure of the carrier liquid is at least 0.01 mm Hg at 25° C. and atmospheric pressure. Vapor pressure of the carrier liquid is preferably at least 0.5 mm Hg, more preferably at least 2 mm Hg, and most preferably at least 5 mm Hg, at 25° C. and atmospheric pressure.

The boiling point of the carrier liquid is suitably from 25 to 250° C., preferably from 25 to 200° C., and more preferably from 25 to 100° C.

Density of the carrier liquids is preferably less than 1.0 g/cc at 25° C., more preferably from 0.7 to 0.99 g/cc at 25° C., and still more preferably from 0.8 to 0.95 g/cc at 25° C. Carriers having a density of less than 1.0 g/cc will float on the surface of water, resulting in a greater burst of preparation aroma in instant coffee beverage applications.

For use in encapsulated preparation aroma products such as those described in co-pending U.S. patent application Ser. No. 09/745,124, filed Dec. 21, 2000, the liquid carriers may have a water solubility of up to about 5 or 10% by weight and are preferably water insoluble. In the present process, because any water present is in the form of ice, water solubility of the carrier or, conversely, solubility of water in the carrier liquid is not crucial. However, non-hydrophilic liquids are preferred and will suitably be either insoluble in water or have a limited water solubility of up to about 5 or 10% w/w. Conversely, solubility of water in the carrier liquid may be up to about 5 or 10% w/w but is preferably essentially nil.

Suitable volatile organic carrier liquids include the following:

| Insoluble Volatile Carriers | Freezing Point (° C.) | Boiling Point (° C.) | Vapor Pressure* (mm Hg) | Water Solubility | Density (g/cc) | Chemical Classification |
|---|---|---|---|---|---|---|
| 2-methylfuran | −89 | 63 | ~260 | insoluble | 0.91 | furan |
| 2,5-dimethylfuran | −62 | 92 | ~50 | insoluble | 0.90 | furan |
| 2-ethylfuran | <−60 | 92 | ~50 | insoluble | 0.91 | furan |
| isobutyl propionate | −71 | 137 | ~6.2 | insoluble | 0.87 | ester |
| methyl hexanoate | −71 | 151 | ~4.0 | insoluble | 0.89 | ester |
| ethyl hexanoate | −67 | 168 | ~1.5 | insoluble | 0.87 | ester |
| heptyl acetate | −50 | 192 | ~0.4 | insoluble | 0.86 | ester |
| methyl octanoate | −40 | 195 | ~2.7 | insoluble | 0.88 | ester |
| heptyl acetate | −50 | 193 | ~0.4 | insoluble | 0.88 | ester |
| ethyl octanoate | −47 | 209 | ~0.3 | insoluble | 0.88 | ester |
| octyl acetate | −80 | 199 | ~0.6 | insoluble | 0.87 | ester |
| methyl decanoate | −18 | 224 | ~0.04 | insoluble | 0.87 | ester |
| heptyl butanoate | −58 | 226 | ~0.05 | insoluble | 0.86 | ester |
| ethyl decanoate | −20 | 245 | ~0.04 | insoluble | 0.86 | ester |
| heptanal | −43 | 153 | ~2.5 | insoluble | 0.82 | aldehyde |
| octanal | −12 | 173 | ~2.4 | insoluble | 0.83 | aldehyde |
| decanal | −5 | 210 | ~0.2 | insoluble | 0.83 | aldehyde |
| 1-heptanol | −35 | 175 | ~0.2 | insoluble | 0.82 | aliphatic alcohol |
| 1-octanol | −16 | 195 | ~0.05 | insoluble | 0.83 | aliphatic alcohol |
| 2-octanol | −39 | 179 | ~0.5 | insoluble | 0.82 | aliphatic alcohol |
| 1-nonanol | −6 | 215 | ~0.2 | insoluble | 0.83 | aliphatic alcohol |
| 2-pentanone | −77 | 102 | 37 | insoluble | 0.81 | ketone |
| 3-heptanone | −39 | 149 | ~3.7 | insoluble | 0.82 | ketone |
| 2-nonanone | −7 | 196 | ~0.4 | insoluble | 0.83 | ketone |
| p-cymene | −69 | 178 | 1.4 | insoluble | 0.85 | monoterpene hydrocarbon |
| d-limonene | −74 | 175 | 2.1 | insoluble | 0.84 | monoterpene hydrocarbon |
| dipentene | −95 | 176 | ~2.0 | insoluble | 0.84 | monoterpene hydrocarbon |
| O-pinene | −64 | 155 | 4.8 | insoluble | 0.86 | monoterpene hydrocarbon |
| II-pinene | −61 | 167 | 4.6 | insoluble | 0.87 | monoterpene hydrocarbon |

-continued

| | | | | | |
|---|---|---|---|---|---|
| isoprene | −147 | 34 | ~580 | insoluble | 0.68 hydrocarbon |
| n-pentane | −130 | 36 | 512 | insoluble | 0.62 hydrocarbon |
| n-hexane | −95 | 69 | ~225 | insoluble | 0.66 hydrocarbon |
| n-heptane | −91 | 98 | 46 | insoluble | 0.68 hydrocarbon |
| n-octane | −57 | 126 | 14 | insoluble | 0.70 hydrocarbon |
| n-nonane | −51 | 151 | ~3.5 | insoluble | 0.72 hydrocarbon |
| n-decane | −30 | 174 | ~1.8 | insoluble | 0.73 hydrocarbon |
| n-undecane | −26 | 196 | ~0.4 | insoluble | 0.74 hydrocarbon |
| 2,2,4-trimethylpentane | −107 | 99 | 37 | insoluble | 0.69 isoparaffin hydrocarbon |
| 2,2,4,6-pentamethylheptane | −67 | 178 | 0.8 | insoluble | 0.75 isoparaffin hydrocarbon |
| dibutyl ether | −98 | 142 | 12.5 | insoluble | 0.76 ether |
| ethyl propyl ether | −79 | 64 | ~210 | insoluble | 0.74 ether |
| dipentyl ether | −69 | 190 | ~1.1 | insoluble | 0.78 ether |

| Slightly Soluble Volatile Carriers | Freezing Point (° C.) | Boiling Point (° C.) | Vapor Pressure* (mm Hg) | Water Solubility | Density (g/cc) | Chemical Classification |
|---|---|---|---|---|---|---|
| ethyl formate | −79 | 54 | ~240 | slight (8%) | 0.92 | ester |
| ethyl acetate | −84 | 77 | 94 | slight (8%) | 0.90 | ester |
| propyl formate | −93 | 82 | ~82 | slight (2%) | 0.90 | ester |
| methyl propionate | −87 | 80 | ~86 | slight (5%) | 0.91 | ester |
| ethyl propionate | −74 | 99 | ~37 | slight (1%) | 0.89 | ester |
| propyl acetate | −93 | 102 | 34 | slight (1%) | 0.89 | ester |
| isopropyl acetate | −73 | 89 | 61 | slight (4%) | 0.87 | ester |
| isobutyl formate | −96 | 99 | ~42 | slight (1%) | 0.88 | ester |
| isobutyl acetate | −99 | 117 | ~20 | slight (1%) | 0.87 | ester |
| ethyl butanoate | −93 | 120 | ~17 | slight (1%) | 0.88 | ester |
| n-butyl acetate | −78 | 126 | 12.4 | slight (1%) | 0.88 | ester |
| propyl butanoate | −97 | 143 | ~5.7 | slight | 0.87 | ester |
| isobutyl isobutanoate | −81 | 157 | ~4.5 | slight | 0.83 | ester |
| methyl heptanoate | −56 | 173 | ~1.4 | slight | 0.87 | ester |
| 2-methylpropanal | −66 | 64 | ~250 | slight (8%) | 0.79 | aldehyde |
| 3-methylbutanal | −51 | 92 | ~40 | slight | 0.78 | aldehyde |
| hexanal | −56 | 128 | ~15 | slight | 0.82 | aldehyde |
| pyrrole | −23 | 130 | 8.2 | slight | 0.97 | pyrrole |
| 1-butanol | −90 | 118 | 6.4 | slight (7%) | 0.81 | aliphatic alcohol |
| 1-pentanol | −79 | 138 | 1.9 | slight (3%) | 0.81 | aliphatic alcohol |
| 1-hexanol | −52 | 157 | ~1.0 | slight (8%) | 0.82 | aliphatic alcohol |
| 2-heptanone | −35 | 151 | ~2.5 | slight | 0.82 | ketone |
| 2-octanone | −16 | 172 | ~1.0 | slight | 0.82 | ketone |
| dipropyl ether | −122 | 91 | ~70 | slight (1%) | 0.74 | ether |

*Includes values reported in the literature and estimates based on available data. Vapor pressure, density and water solubility (weight %) reported at 25° C. Not all compounds listed are approved for food use.

It is preferred, for simplicity, to utilize a single volatile carrier liquid. However, more than one carrier liquid may be employed, and the selected carrier liquids may be of different chemical classifications. Where more than one carrier liquid is employed, it is preferred that the selected liquids are miscible with one another and that they are of the same chemical classification.

The volatile liquid carriers are preferably bland, but may have an inherent aroma. The amount of aroma generated by the carrier is generally small relative to the aroma generated by the coffee aroma of the aromatized carrier liquid. In some cases, the inherent aroma of the carrier liquid will be essentially undetectable. In any event, inherent aroma of a volatile carrier liquid may be reduced by conventional deodorizing techniques such as adsorption, extraction or distillation. However, it is possible to select a volatile carrier which has an inherent aroma which is appropriate for a coffee beverage. For example, furan and a variety of alkyl substituted furans such as 2-methylfuran, 2-ethylfuran, and 2,5-dimethylfuran occur naturally in coffee at extremely low levels in combination with a wide variety of other compounds, and, when obtained from coffee, have inherent coffee-compatible aroma. These furans do not occur naturally in coffee in sufficient quantity to be used economically as volatile carriers, but they can be readily obtained from other sources. A volatile carrier liquid with a fruity aroma, such as non-deodorized d-limonene which has a mild citrus aroma, is a suitable carrier for aromas for dehydrated fruit-flavored coffee beverage products.

The coffee aroma may be any coffee aroma obtained during coffee processing such as the production of roasted and ground coffee and instant coffee. Such aromas, and/or the gas streams from which the aromas are obtained, may be fractionated or may be purified to remove undesirable compounds as is done conventionally in the art. Such aromas are usually obtained at low temperature, typically at cryogenic temperatures, including temperatures below the freezing point of carbon dioxide. Coffee aroma frosts which include carbon dioxide, water ice, and coffee aroma compounds are widely used as a source of coffee aroma and are readily processed in accordance with the present invention. As shown in the examples which follow, a coffee aroma frost can be contacted directly with a volatile carrier liquid of the invention or the frost can be contacted with the carrier liquid after sublimation of some or all of the $CO_2$ from the frost. After such $CO_2$ sublimation, some or all of the aroma compounds may be in liquid form. In any event, it is essential that the processing temperature is such that any moisture present is in the form of ice at least until separation or recovery of an aroma-enriched liquid carrier from the aroma source.

When the coffee aroma source is a $CO_2$-containing coffee aroma frost, it is preferred to bring the frost and liquid carrier into contact at a temperature such that $CO_2$ contained in the frost sublimes. However, it is not necessary to cause $CO_2$ sublimation, because aroma fixation can be achieved at temperatures below the sublimation temperature of $CO_2$. When it is desired to effect sublimation of $CO_2$ from a frost, contact with the liquid carrier is maintained for a time sufficient to effect such sublimation, and preferably for a time sufficient to effect sublimation of substantially all of the $CO_2$ contained in the frost. Contact time to effect sublimation will depend on many factors, particularly the heat exchange rate. In general, contact time is set to control the rate of $CO_2$ sublimation, and to effect mixing and equilibrium to ensure fixation of aroma in the carrier. The rate of sublimation of the $CO_2$ is controlled to avoid excessive bubbling and consequent product carry over, typically by adjusting heat input to the vessel. Contact time with a frost is typically less than four hours. For liquid coffee aromas, contact time is typically less than two hours.

The method of the invention can be carried out in readily available equipment, either continuously, semi-continuously, or batch. For batch processing of an aroma frost, a jacketed vessel equipped with an agitator for stirring and having a vent for sublimed $CO_2$ is suitable. An appropriate amount of carrier liquid is added to the vessel and chilled to processing temperature by coolant circulated through the jacket. An appropriate amount of aroma frost is then added manually or in any convenient mechanical manner such as by screw feeder. The rate of addition of frost is controlled, together with processing temperature (i.e., the temperature of the mixture in the vessel) such that sublimation of $CO_2$ is effected. After $CO_2$ sublimation and fixation of the aroma in the carrier liquid have been effected to the desired extent, the contents of the vessel are removed and the aromatized carrier liquid is recovered by separation from the water ice and any remaining frost. While it is preferred to add frost to the carrier, it is also possible to add carrier to the frost. In that event, the carrier should be chilled to prevent rapid $CO_2$ sublimation and melting of ice. During the entire processing time, that is the time that the carrier liquid is in contact with the aroma, the temperature of the mix is sufficiently low that any moisture present is in the form of ice. After recovery of the aromatized carrier liquid, it is preferably kept very cold to minimize aroma loss or degradation until it is used.

The method can also be carried out continuously or semi-continuously in readily available equipment. For continuous processing, an elongated jacketed screw conveyor vessel is suitable. The aroma and carrier liquid would be metered at appropriate rates into one end of the vessel and the mixture moved through the vessel by rotation of the screw. The mixture discharged from the other end of the vessel would be passed through a screen or filter to separate the aromatized carrier liquid from the ice or any remaining frost particles. Again, the temperature of the mixture would be sufficiently low to ensure that any moisture present will be in the form of ice during the entire process. Semi-continuous operation is readily accomplished in a plurality of batch vessels operated alternately.

For processing of a liquid coffee aroma such as that remaining after sublimation of $CO_2$ from a coffee aroma frost, the aroma fixation method of the invention can be carried out by simple admixture of the carrier and aroma in similar equipment. Temperature of the vessel contents are, again, maintained sufficiently low to keep any moisture present in the form of ice.

The fixation of aroma into the volatile carriers can be carried out at atmospheric pressure or under elevated or reduced pressure. Atmospheric pressure fixation is ideal for aroma compounds with freezing points very close to the $CO_2$ sublimation temperature. High pressure fixation, where the frost is heated and partially or totally molten before the introduction of the carrier, is preferred with aroma compounds with higher freezing points, typically above $-40°$ C.

For processing of aroma frost, after sublimation of the $CO_2$ is completed, it is sometimes preferred to raise the processing temperature from a generally low temperature suitable for $CO_2$ sublimation to a higher temperature just below the melting point of water ice in order to facilitate fixation of aroma compounds that may be trapped in water ice crystals. At these temperatures, typically about $-15°$ C. to $-5°$ C., partitioning of aroma into a water phase and transfer of water into the carrier do not occur because water is present as solid ice.

The wide range of temperatures employed in the invention results from the respective steps of the process. The fixation of the aroma compounds into the carrier typically occurs at about $-75°$ C. to $-20°$ C. during sublimation of the $CO_2$, while temperature may be raised to as high as $-5°$ C. during removal of the aroma compounds from the water ice. The low temperatures used are ideal to retain the roasted and fresh aroma notes particularly well suited for jar and preparation aroma applications. The low temperature and the presence of the liquid carrier permit the rapid transfer of the most volatile compounds.

The aroma frost:carrier fixation ratio, i.e., the ratio of the weight of aroma frost to the weight of liquid carrier, that can be efficiently utilized in the invention can vary widely. It is an advantage of the invention that high frost:carrier fixation ratios of as much as 20:1 or higher can be employed, and that low-moisture aromatized carrier liquids can be achieved at such high fixation ratios. These benefits are largely due to the low processing temperatures of the invention which cause any moisture present to be in the form of ice, and to the physical properties of the volatile carrier liquids of the invention, namely their low freezing point, which enables the carriers to remain liquid at the prevailing low processing temperatures, and their low water solubility. The liquid nature of the carriers at these temperatures facilitates physical mixing of the carrier and aroma. As a comparison, coffee oil typically has a room temperature viscosity of about 100 to 150 centipoise which rapidly increases at lower temperatures, whereas room temperature viscosity of the present volatile carrier liquids is typically less than 10 centipoise and more typically less than 1 centipoise. Further, since aromatization of a coffee oil carrier involves processing at temperature at which moisture is present in the form of water, the amount of detrimental water in the aromatized coffee oil carrier will increase as the amount of frost is increased. However, in the present invention, the moisture content of the aromatized volatile carrier liquids will be low because any moisture present during the process will be in the form of ice. Frost:carrier fixation weight ratios of from 1:1 to 20:1 are preferred, and ratios of from 2:1 to 10:1 are more preferred. The present invention enables aromatization with coffee aroma frost at these fixation ratios, continuously or non-continuously, with short processing times. By contacting the present low freezing point, low water-soluble, volatile organic carrier liquids with coffee aroma frosts, it is possible to achieve extremely high loading of excellent quality aroma.

The volatile carrier optionally can be pre-aromatized by other means prior to aromatization using the method of the invention. Pre-aromatization can be effected to utilize other available aroma sources, improve process flexibility, or beneficially tailor the sensory attributes of the aromatized volatile carrier to specific product applications. The volatile carrier may be pre-aromatized by direct or indirect contact with a coffee aroma source including, but not limited to, whole or ground roasted beans, native or aromatized oils, aqueous or solvent extracts, and steam condensates or distillates.

Contact with roasted coffee or coffee oil requires any insoluble material or oil transferred to the aromatized volatile carrier to be substantially removed to prevent sediment and slick formation in beverage applications. This can be accomplished, preferably before contact with aroma frost, using vacuum distillation, most preferably high vacuum distillation at less than 10 μm Hg, to evaporate only aroma and volatile carrier from the treated materials. The aroma and volatile carrier can then be condensed under conditions, preferably cryogenic conditions, effective to produce a substantially oil-free, liquid, aromatized volatile carrier. Any $CO_2$ that may be present can be removed by sublimation and any moisture that may be present can be removed by freezing to form ice that can be filtered out, these procedures being conducted at any appropriate time during the process.

While pre-aromatization requires additional processing steps, it can be an effective way to impart desirable aroma components to the volatile carrier for specific product applications. In addition, other established concentration and separation techniques can be used in conjunction with pre-aromatization to improve process efficiency or quality of the pre-aromatized carrier. For example, aqueous aroma sources can be concentrated prior to use via low-temperature vacuum distillation or membrane filtration to facilitate transfer of aroma constituents into the volatile carrier while minimizing exposure of aroma to high processing temperatures that could lead to loss or degradation.

EXAMPLE 1

Coffee aroma frost produced from percolation vent gas of a commercial instant coffee process was contacted with deodorized d-limonene carrier liquid in a vessel. The frost contained less than 5% w/w water. Addition of frost to the vessel was conducted incrementally over three hours while the temperature of the mixture in the vessel was maintained between −75° C. and −30° C., causing sublimation of the $CO_2$ content of the frost and fixation of coffee aroma in the carrier liquid. A water ice phase was present in the mixture. $CO_2$ sublimation (evidenced by bubbling), the presence of water as ice, and non-solidification of the mixture were used, together with temperature measurements, to regulate the rate of the addition of the frost. After the last portion of frost was added, the mixture was removed from the vessel and the aromatized carrier liquid was separated from the water ice present in the mixture. Three tests were carried out, each using 1 kg of the aroma frost and varying amounts of carrier liquid. The aromatized carrier liquids were analyzed for coffee aroma content by head space gas chromatography (HS-GC).

As a comparison, 72 kg of the same coffee aroma frost was contacted with 45 kg of expelled coffee oil. After eight hours of sublimation of $CO_2$, equilibration, and decanting, an aromatized coffee oil was obtained. Temperature during the aromatization process was maintained between 15 and 25° C.

Results were as follows:

| Test | Frost:Carrier Fixation Ratio (w:w) | Time (hr.) | Aroma Content (HS-GC Counts) | Moisture Content of Aromatized Carrier (% w/w) | Extent of Aroma Recovery (% w/w) |
| --- | --- | --- | --- | --- | --- |
| 1A | 10:1 | 2 | 2100 | ~0.1 | ~90 |
| 1B | 10:1 | 2 | 2100 | ~0.1 | ~90 |
| 1C | 12:1 | 4 | 2300 | ~0.1 | ~90 |
| Coffee Oil Comparison | 1.6:1 | 8 | 300 | ~1.5 | ~80 |

Although carrier aroma content was roughly proportional to the frost: carrier ratio, independent of carrier type, it will be recognized that use of a volatile organic carrier of the invention can beneficially permit a higher frost:carrier ratio to be used. In this example, the combination of low freezing point, low viscosity, and low solubility of water in d-limonene permitted a much greater frost: carrier ratio than typically used for coffee oil, while beneficially producing a completely volatile aromatized carrier having not only a high aroma content, but also a low moisture content.

EXAMPLE 2

The aromatized carrier liquids of tests 1B and 1C of Example 1 were encapsulated in instant coffee via emulsification in coffee extract and desiccation in instant coffee powder. 37.5 g of Kenco™ Really Rich freeze dried instant coffee was dissolved in 37 g of water. 7.0 g of the aromatized carriers of tests 1B and 1C were emulsified into separate portions of the coffee solution and droplets of the solution portions were dropped into liquid nitrogen to form frozen particles. The particles were then separated from liquid nitrogen and dried in 1500 g of milled (100 microns average particle size), freeze dried (1% moisture) Kenco™ Really Rich instant coffee for 48 hours. The capsules obtained were blended into Kenco™ Really Rich freeze dried instant coffee at levels between 3 to 10% w/w. On preparing a brew with hot or boiling water, a fresh and intense coffee aroma burst was released. The preparation aroma impact and quality of the brews prepared with the aromatized capsules was judged by an expert panel to be superior to brews prepared without the capsules.

EXAMPLE 3

5 kg of coffee aroma frost was produced from percolation vent gas of a pilot plant instant coffee process. The frost contained 15% w/w water.

200 g and 500 g portions of the frost were used to aromatize 100 g of deodorized d-limonene using the procedure of Example 1. HS-GC analysis was also carried out as in Example 1. As a comparison, 700 g of the same frost was aromatized with 445 g of coffee oil. After seven hours, $CO_2$ sublimation, equilibration, and decanting were complete, 450 g of aromatized oil was obtained. Results were as follows:

| Test | Frost:Carrier Fixation Ratio (w:w) | Time (hr.) | Aroma Content (HS-CG Counts) | Moisture Content of Aromatized Carrier (% w/w) | Extent of Aroma Recovery (% w/w) |
|---|---|---|---|---|---|
| 3A | 2:1 | 1.5 | 130 | ~0.1 | ~90 |
| 3B | 3:1 | 2 | 300 | ~0.1 | ~90 |
| Coffee Oil Comparison | 1.6:1 | 7 | 80 | ~1.5 | ~50 |

These tests show that the method of the invention is rapid and efficient. Moreover, the low moisture content of the aromatized carrier, resulting in part from the low temperature processing conditions, is also beneficial.

EXAMPLE 4

One part of 2-ethylfuran carrier was contacted with 20 parts of frost collected in scraped surface heat exchangers regulated at −120° C. from roasted coffee bean grinder vent gas. The addition of frost to the carrier was conducted incrementally, at a rate suitable to control the temperature of the preparation between −75° C. and −20° C. $CO_2$ gently bubbled from the carrier. When the final portion of frost was added, the water ice present in the preparation was separated from the aromatized carrier and the sample kept at −60° C. for analysis, sensory evaluation, and encapsulation. HS-GC analysis gave 1000 GC counts.

EXAMPLE 5

A mixture of 25.2 g 24DE (dextrose equivalent) corn syrup solids and 2.0 g Hyfoama DSN hydrolyzed milk protein (Quest International) was dissolved in 15.8 g water. 7.0 g of the aromatized carrier of Example 4 was emulsified into the solution, and then dropped into and dried in an excess amount of powdered 10DE corn maltodextrin for 48 hours.

The capsules were sieved and the 1–3 mm fraction was incorporated in Jacobs™ Zauber instant cappuccino mix at a level of 1.5% w/w. An expert panel judged the aroma burst released on makeup of the beverage in 75° C. water as fresh, roasted and intense, good quality coffee aroma.

EXAMPLE 6

This example demonstrates aromatization of volatile organic carrier liquids with a coffee aroma obtained by removing $CO_2$ from a coffee aroma frost by sublimation.

100 g of a coffee aroma frost collected from the vent gas of the fresh percolator column of a commercial instant coffee process was placed in a 200 mL beaker positioned in a desiccator vessel. Sublimation of the $CO_2$ from the frost was controlled by contacting the exterior of the beaker with an excess of dry ice pellets. Temperature of the frost was then maintained at −75 to −40° C. The desiccator vessel was closed, but included a vent to permit escape of the $CO_2$. The ice-containing liquid aroma remaining in the beaker was kept at −40° C. and contacted with 5 g of deodorized d-limonene at −20° C. After gentle shaking of the mixture, the aromatized carrier liquid was separated from the ice crystals. An expert panel evaluated the aroma released from a droplet of this aromatized carrier liquid placed on the surface of a cup of hot coffee. The aroma burst was judged to be fresh and of good quality.

EXAMPLE 7

The following model frosts were prepared:

|  | Solid $CO_2$ (g) | Water (g) | Aroma (g) |
|---|---|---|---|
| Frost 1 | 100 | 0 | 0.65 2-methylfuran |
|  |  |  | 0.65 2,3-pentanedione |
|  |  |  | 1.3 acetone |
| Frost 2 | 90 | 0 | 0.4 2-methylfuran |
|  |  |  | 0.4 2,3-pentanedione |
|  |  |  | 0.8 acetone |
| Frost 3 | 100 | 0 | 0.4 dimethylsulfide |
|  |  |  | 0.4 2,3-pentanedione |
|  |  |  | 0.4 diacetyl |
|  |  |  | 0.42 2-methylpropanal |
| Frost 4 | 100 | 3 | 0.43 dimethylsulfide |
|  |  |  | 0.43 2,3-pentanedione |
|  |  |  | 0.43 diacetyl |
|  |  |  | 0.43 2-methylpropanal |
| Frost 5 | 100 | 2 | 0.43 dimethylsulfide |
|  |  |  | 0.43 2,3-pentanedione |
|  |  |  | 0.43 diacetyl |
|  |  |  | 0.43 2-methylpropanal |

Fixation was then carried out as follows:

Frost 1:

A concentrated liquid aroma was prepared from Frost 1 by the technique described in Example 6. Sublimation was stopped when 10% v/v of the initial aroma frost remained in the 200 mL beaker. The beaker was kept in dry ice. 10 g of deodorized, −60° C. d-limonene was introduced into the beaker and the preparation was gently shaken. After sublimation of the residual $CO_2$ still present after the concentration of the aroma, the aromatized carrier was transferred to a vial, sealed and weighed. A mass balance indicated that 90% of the aroma was recovered. Karl Fischer water analysis of the aromatized carrier showed that no water was present, thus confirming that no water had been condensed in the carrier from the atmosphere during the aromatization process. Further, since some loss occurred during the transfer of the mixture into the vial, actual efficiency is in excess of the measured efficiency.

Frost 2:

Liquid coffee aroma was prepared from Frost 2 by the technique described in Example 6. 10 g of deodorized, −60° C. d-limonene was introduced into the beaker, and the preparation was gently shaken. The aromatized carrier was transferred to a vial, sealed and weighed. The mass balance indicated that 85% of the aroma was recovered. Karl Fischer water analysis of the aromatized carrier showed that no water was present, thus confirming that no water had been condensed in the carrier from the atmosphere during the aromatization process. Further, since some loss occurred during the transfer of the mixture to the vial, actual efficiency is in excess of the measured efficiency.

Frost 3:

100 g of Frost 3 was placed in a beaker in an enclosed container and a slight positive pressure was maintained in order to avoid moisture pickup from the atmosphere. 11.7 g of deodorized, −60° C. d-limonene was introduced into the beaker. The sublimation temperature was controlled to around −75° C. The beaker was contacted with an excess of dry ice in the final stages to maintain a low temperature. 13 g of aromatized d-limonene containing 10.7% w/w aroma was recovered. The following recovery efficiencies were measured (% by weight of aroma recovered in carrier liquid based on weight of aroma in frost).

| Aroma Component | Recovery (%) |
| --- | --- |
| dimethylsulfide | 71 |
| 2-methylpropanal | 86 |
| diacetyl | 90 |
| 2,3-pentanedione | 99 |
| Total | 86 |

Frost 4:

100 g of Frost 4 containing 1.6% aroma and 3% water was placed in a beaker in an enclosed container and a slight positive pressure was maintained to avoid moisture pickup from the atmosphere. 10 g of deodorized, −60° C. d-limonene was introduced into the beaker. The sublimation temperature was controlled to around −75° C. The beaker was contacted with an excess of dry ice in the final stages to maintain a low temperature.

Water was present as ice and was separated by passing the liquid through a fine mesh sieve. 14.4 g of aromatized d-limonene was recovered which contained 12% w/w aroma. The following recovery efficiencies were measured (% by weight of aroma recovered in carrier liquid based on weight of aroma in frost):

| Aroma Component | Recovery (%) |
| --- | --- |
| dimethylsulfide | 76 |
| 2-methylpropanal | 85 |
| diacetyl | 84 |
| 2,3-pentanedione | 91 |
| Total | 84 |

Frost 5:

100 g of Frost 5 was placed in a beaker in an enclosed container and a slight positive pressure was maintained in order to avoid moisture pickup from the atmosphere. 50 g of deodorized, −60° C. d-limonene was introduced into the beaker. The sublimation temperature was controlled to around −75° C. The beaker was contacted with an excess of dry ice in the final stages, to maintain a low temperature. The water was present as ice and was separated by passing the liquid through a fine mesh sieve. 54.4 g of aromatized d-limonene were recovered which contained 2.7% w/w aroma. The following recovery efficiencies were measured (% by weight of aroma recovered in carrier liquid based on weight of aroma in frost):

| Aroma Component | Recovery (%) |
| --- | --- |
| dimethylsulfide | 71 |
| 2-methylpropanal | 81 |
| diacetyl | 80 |
| 2,3-pentanedione | 84 |
| Total | 81 |

EXAMPLE 8

85 g of the aroma frost of Example 3 was used to aromatize 17 g of pre-aromatized d-limonene following the procedure of Example 3. Moisture content of the aromatized carrier liquid was less than 0.1% w/w and its HS-GC count was 350. The carrier was pre-aromatized by liquid—liquid extraction of an aqueous coffee aroma obtained from the vent gas of the fresh percolator column of a commercial instant coffee process. Batch pre-aromatization was carried out by contacting 100 g of the aqueous coffee aroma with 20 g of deodorized d-limonene for about five minutes at a temperature of about 2° C., and the pre-aromatized carrier liquid was separated from the aqueous phase. Pre-aromatization enabled efficient recovery of important flavor compounds such as aldehydes and pyrazines which would normally be condensed and lost in the water removal step typically conducted in conventional coffee oil aromatization methods to minimize moisture content of the oil.

What is claimed is:

1. A method for preparing a coffee aromatizing composition which comprises contacting a coffee aroma with a volatile organic carrier liquid at a processing temperature at which said carrier is in the liquid state and at which any moisture present is in the form of ice, and recovering an aromatized carrier liquid, said carrier liquid having a freezing point below said processing temperature and a boiling point above said processing temperature, a vapor pressure of at least 0.01 mm Hg at 25° C. and atmospheric pressure, and having a water solubility of not more than 10% by weight.

2. A method according to claim 1 wherein said coffee aroma comprises a $CO_2$-containing coffee aroma frost.

3. A method according to claim 2 wherein the weight ratio of frost:carrier liquid is from 1:1 to 20:1.

4. A method according to claim 2 wherein the weight ratio of frost:carrier liquid is from 2:1 to 10:1.

5. A method according to claim 2 wherein said coffee aroma frost comprises a fractionated coffee aroma frost.

6. A method according to claim 2 wherein said contact between said coffee aroma frost and said liquid carrier is effected at a temperature such that $CO_2$ contained in said coffee aroma frost sublimes and wherein said processing time is sufficient to effect sublimation of substantially all of the $CO_2$ contained in said coffee aroma frost.

7. A method according to claim 1 wherein said processing temperature is from −150 to 0° C.

8. A method according to claim 1 wherein said coffee aroma comprises water ice and coffee aroma obtained by removing $CO_2$ from a $CO_2$-containing coffee aroma frost by sublimation of $CO_2$.

9. A method according to claim 1 or claim 2 wherein said processing temperature is from −5 to −120° C.

10. A method according to claim 1 or claim 2 wherein said processing temperature is from −10 to −100° C.

11. A method according to claim 1 or claim 2 wherein said processing temperature is from −20 to −80° C.

12. A method according to claim 1 wherein more than one of said volatile organic carrier liquids are employed.

13. A method according to claim 12 wherein said volatile organic carrier liquids are miscible with one another.

14. A method according to claim 12 wherein said volatile organic carrier liquids belong to the same chemical classification.

15. A method according to claim 1 wherein said volatile organic carrier liquid is water insoluble.

16. A method according to claim 1 wherein said volatile organic carrier liquid has a density of less than 1.0 g/cc at 25° C.

17. A method according to claim 1 wherein said volatile organic carrier liquid has a vapor pressure of at least 0.5 mm Hg at 25° C. and atmospheric pressure, a boiling point in the range of 25–250° C., and water solubility of not more than about 5% by weight at 25° C.

18. A method according to claim 15 wherein said volatile organic carrier liquid has a vapor pressure of at least 2.0 mm Hg at 25° C., a boiling point in the range of 25–200° C., and a density in the range of 0.7 to 0.99 g/cc at 25° C.

19. A method according to claim 15 wherein said volatile organic carrier liquid has a vapor pressure of at least 5.0 mm at 25° C., a boiling point in the range of 25–200° C., and a density in the range of 0.8 to 0.95 g/cc at 25° C.

20. A method according to claim 1, wherein said volatile organic carrier liquid comprises at least one member selected from the group consisting of monoterpene hydrocarbons, esters, and alkyl furans.

21. A method according to claim 1, wherein said volatile organic carrier liquid comprises at least one member selected from the group consisting of d-limonene, 2-ethylfuran, 2-methylfuran, 2,5-dimethylfuran, and ethyl acetate.

22. A method according to claim 1 wherein said volatile organic carrier liquid is pre-aromatized prior to said contacting with said coffee aroma.

* * * * *